United States Patent [19]

Hamrick et al.

[11] 4,409,786
[45] Oct. 18, 1983

[54] WOOD BURNING SYSTEM AND METHOD

[75] Inventors: Joseph T. Hamrick, Roanoke; Leslie C. Rose, Rocky Mount, both of Va.

[73] Assignee: Biomass Energy Systems, Incorporated, Fort Worth, Tex.

[21] Appl. No.: 22,520

[22] Filed: Mar. 21, 1979

Related U.S. Application Data

[63] Continuation-in-part of Ser. No. 811,950, Jun. 30, 1977, abandoned, which is a continuation-in-part of Ser. No. 788,426, Apr. 18, 1977, abandoned.

[51] Int. Cl.³ .............................................. F02C 3/26
[52] U.S. Cl. .................................... 60/39.464; 60/736
[58] Field of Search ............ 60/39.46 S, 736, 39.51 R; 110/224, 225

[56] References Cited

U.S. PATENT DOCUMENTS

| | | | |
|---|---|---|---|
| 2,148,981 | 2/1939 | Dundas et al. | 110/224 |
| 2,171,535 | 9/1939 | Berg et al. | 60/39.46 S |
| 2,625,791 | 1/1953 | Yellott | 60/39.46 S |
| 2,735,266 | 2/1956 | Atherton | 60/39.46 S |
| 2,949,010 | 8/1966 | Cederquist | 60/39.46 S |
| 3,252,435 | 5/1966 | Bogot et al. | 110/224 |
| 4,090,455 | 5/1978 | McCartney | 110/302 |
| 4,152,890 | 5/1979 | Weiland | 60/39.46 S |

Primary Examiner—Louis J. Casaregola
Attorney, Agent, or Firm—Wofford, Fails & Zobal

[57] ABSTRACT

A system and method provides for burning wood particles or other combustible fibrous particles at a continuous high rate in which the particles are at least partially pyrolyzed as they are being fed into a combustion chamber, complete combustion of the particles and pyrolysis products occuring within the combustion chamber. Pyrolysis is enabled by mixing the particles with air having a temperature of at least 600° F. The system enables the burning of green wood in existing large boiler systems as well as in gas turbine systems; the latter operatable with a high pressure combustion chamber. In a boiler system, air for pyrolysis of the particles may be heated by the boiler, in a turbine system, air for pyrolysis of the particles may be heated by a compressor driven by a turbine.

9 Claims, 10 Drawing Figures

WOOD BURNING SYSTEM AND METHOD

CROSS-REFERENCE TO RELATED APPLICATION

This application is a continuation-in-part of U.S. Patent Application Ser. No. 811,950 filed June 30, 1977, now abandoned, which is a continuation-in-part of U.S. Patent Application Ser. No. 788,426 filed Apr. 18, 1977, now abandoned.

BACKGROUND OF THE INVENTION

This invention relates generally to the combustion of wood or other combustible fibrous particles and more particularly to a burning system and method for rapid combustion of fibrous particles.

Wood burning furnaces for boilers currently in use are relatively small, rarely exceeding the production of approximately 0.25 million pounds of steam per hour. Modern fossil fueled power plants which generally exceed a production rate of 3 million pounds of steam per hour can burn natural gas, oil, or powered coal interchangeably.

For rapid combustion in air, solids must be finely divided or the combustion air temperature must be high enough to quickly volatilize a signicant amount of the solid. The ratio of the volume of air to volume of solid required to burn a given volume of solid as atmospheric pressure ranges from approximately 3500 for wood to 12,000 for coal. With a particle of 74 microns or approximately 0.003 inches diameter, which is representative of 65 percent of the coal particles used in firing a powdered coal fired furnace, there would be approximately $1.6 \times 10^9$ particles per pound of bituminous coal, assuming spherical particles. For eastern bituminous coal approximately 10.8 pounds of air per pound of coal are required for combustion. Using a density of 84 lbs./ft.$^3$ for coal and 0.07528 lbs./ft.$^3$ for air, the number of 74 micron particles of coal in a cubic ft. of air is approximately 11 million or approximately 6400 particles per cubic inch.

Pulverizing of wood to small particle sizes requires more energy than for coal. With current methods, pulverizing wood to pass a ½ inch screen is the approximate minimum size that is economically feasible. A representative particle of wood passing a ½ inch screen is 5/16 inch×3/64 inch. There would be approximately 45,000 of these particles per pound of wood. Using a representative figure of 6.35 pounds of air per pound of wood, a density of 42 lbs. per cubic ft. for wood, and 0.07528 lbs. per cubic ft. of air the number of particles of wood per cubic foot of air is approximately 536 or 3 particles per cubic inch. Thus the distribution of 74 micron coal particles in the combustion air is much more favorable to rapid combustion than for wood particles passing a ½ inch screen.

Another approach to the comparison of wood and coal is from standpoint of ratio of particle surface area to particle weight. The time required for combustion of a particle varies inversely with the ratio of surface area to particle weight. The ratio of surface area to weight for a 74 micron spherical particle of bituminous coal is 42,300 in.$^2$/lb. For the 5/6×1/16×3/64 wood particles it is 3342 in.$^2$/lb. Thus, the burning rate for the coal particle would be approximately 13 times that for the wood if the basic burning rates for coal and wood were equal. The foregoing comparisons indicate in order to burn wood particles a method and system different from that currently used for powdered coal probably will be required.

One major difference between coal and wood lies with the behavior of each on being heated. Coal will begin to coke at between 160° F. and 200° F. depending upon the type. Therefore, the primary air with which the coal is mixed before being ignited must be kept below 160° F. to 200° F. to prevent the coalparticles from agglomerating in the transit duct and burner. Wood on the other hand, can be heated to approximately 600° F. without agglomerating or igniting.

The pulverization of wood is more difficult than of coal because wood is fibrous and must be shredded whereas coal is brittle and shatters on impact. At present, the cost of reducing wood to a fine powder as is done with coal is excessive. Reducing wood to particles that will pass a half inch screen is approximately the economic breaking point from standpoint of minimum particle size. The wood particles that pass a half inch screen normally consist of flat slivers that vary from 1/16 inch to ½ inch long, 1/64 inch to 3/64 inch thick, and 1/32 inch to 1/16 inch wide. However, there are some very fine wood particles intermixed with the slivers.

The normal practice in firing pulverized coal is to mix the particles with enough 160° F. to 200° F. primary air to burn the volatile matter which may constitute on the order of 16 to 40 percent of the coal on a dry basis depending upon the source of the coal. The secondary air which supports combustion of the fixed carbon particles and any remaining volatiles is preheated to approximately 600° F. The system is so arranged that the secondary air sweeps in, surrounding the primary air combustion zone. The volatile matter in dry wood constitutes on the order of 80 percent of the wood, approximately two to three times that for coal and the fixed carbon is only ¼ to ⅓ that for coal. Thus, in addition to the non-coking features of wood as compared to coal, its properties are such that methods of burning will have to be different from those for coal in order to achieve rapid and efficient combustion.

Wood or fibrous particle burning systems utilizing turbines have heretofore generally not been available due to problems related to wood burning rates and undesirable turbine blade abrasion and clogging of internal turbine surfaces.

A turbine engine is useful in driving a generator for producing electrical power. Such turbine powered generator systems may have a maximum output power of 60 megawatts and have much lower installation costs, per unit of output power, than either fossil or nuclear fuel.

In general, a turbine engine includes an air compressor, a combustion chamber for burning fuel in high pressure air, and a turbine through which high pressure combustion gases are expanded to produce work. Work in excess of that required to compress the air is used to drive an electric generator.

Typically, turbine systems employ natural gas or fuel oil, rather than a fossil fuel, such as coal, because gas or oil combustion products do not include significant ash content which, when fed through the turbine blades clog internal turbine surfaces.

Additional advantages of utilizing gas turbine powered generators over boiler powered generators is that such a plant has a high degree of mobility and no water supply is required, as is needed in conventional boiler-plant type power generating systems.

Current and future sources of natural gas and fuel oils being in increasing limited supply, power generating systems utilizing turbine engines do not provide a means of satisfying ever increasing electrical energy needs. The use of combustible fibrous particles, such as wood, or fossil fuels such as coal, as fuels for turbine engines presents a significant problem because of turbine blade abrasion and clogging as hereinabove mentioned. An additional problem associated with wood or coal fuel relates to achieving combustion of such fuels with high heat release rates as necessary to run a turbine engine.

Between the two fuels, namely, wood particles and coal, the former has greater potential as a turbine fuel than the latter, because wood has significantly less ash, produced by combustion thereof, than coal. Further, wood is a replenishable fuel as opposed to coal.

A previous attempt to use wood as a turbine fuel, as for example U.S. Pat. No. 2,735,266 to Atherton, utilizes a chamber to burn and pyrolize wood on a grate to form combustible products, which are then injected into a second chamber for complete combustion thereof before introduction into a turbine. Such a system is not applicable for generation of significant amounts of power because of the low wood burning rates inherently limited by the burning of wood on a grate or pile. Further, Atherton utilizes a combustion chamber pressurized to only two or three atmospheres, hence the volume of air available for the combustion of the wood is much larger than for a higher pressure system, and consequently heat release rates are thereby limited and a large, combustion chamber is required.

The present invention enables fibrous particles to be completely burned while suspended within a combustion chamber. As hereinbefore pointed out, wood particles can be burned at high heat release rates by injecting wood particles into air at a temperature of approximately 800° to 1000° F., whereupon the wood surfaces immediately undergo pyrolysis as they are being fed into a combustion chamber and the resultant mixture of charred wood particles and combustion products are burned in a combustion zone in a manner similar to natural gas or propane.

The heat release attained through burning process may in the range of 100,000 to 150,000 btu/ft$^3$/hr. This is important in that it enables the combustion chamber to be smaller, a smaller chamber in turn enabling less ducting, and closer proximity to the turbine thereby enabling greater thermal efficiency.

SUMMARY OF THE INVENTION

It is an object of the present invention to provide a system and method for wood burning particles in existing large boiler systems.

It is a further object of the present invention to provide a system and method of burning wood particles such that the wood particles can be burned interchangeably with oil, gas and powdered coal in a boiler system.

It is a further object of the present invention to provide a system and method of burning wood particles in a gas turbine.

In accordance with the present invention, for a boiler system, there is provided a combustion chamber and injecting means for feeding fibrous particles into the combustion chamber in a substantially continuous manner. Pyrolysis means provide pre-combustion heating of the particles as the particles are being fed into the combustion chamber and further causes pyrolyzation of at least some of the particles to form pyrolysis products. The pyrolysis products are fed into the combustion chamber with unpyrolyzed particles to thereby enhance combustability of the mixture.

Means are also provided for igniting the particles and pyrolysis products in the combustion chamber for combustion of the particles and pyrolysis products therein.

In an exemplary embodiment of the boiler system, means are provided for injecting primary air into the combustion chamber with the particles and the pyrolysis means includes means for heating the primary air to a temperature of at least approximately 600° F.

The method of the present invention is carried out by injecting fibrous particles into a combustion chamber in a substantially continuous manner, pyrolyzing products as the particles are being fed into the combustion chamber and injecting air into the combustion chamber for enabling combustion of the particles and pyrolysis therein.

Also, in accordance with this invention, a wood burning gas turbine system or apparatus includes a combustion chamber, a turbine and an injecting means for feeding fibrous particles such as wood, into the combustion chamber in a substantially continuous manner. The continuous introduction of fuel into the combustion chamber maintains combustion therein.

Additionally, pyrolysis means is included for precombustion heating the particles as the particles are being fed into the combustion chamber and pyrolyzing some of the particles to form pyrolysis products, the pyrolysis products being fed into the combustion chamber with the unpyrolyzed particles. Means is provided for igniting the particles and the pyrolysis particles in the combustion chamber, and means for injecting air into the combustion chamber enable complete combustion of the particles and the pyrolysis products therein to form combustion gases, whereupon such gases are injected into the turbine.

In an exemplary embodiment of the turbine system the pyrolysis means include an air compressor mechanically driven by the turbine, the air compressor causing compression of the air and consequently heating thereof. The compressed air is additionally heated with the use of ducts, or conduits, which are configured for causing the compressed air to circulate past the combustion chamber before it is fed into the combustion chamber.

This ducting configuration has the advantage of utilizing heat generated by the combustion chamber to further heat the compressed air and additionally, because both the ducting leading from the air compressor and the combustion chamber are at approximately the same pressure, the walls of the combustion chamber, which may be at quite high temperatures, are not subjected to significant stress, the containment of the pressure, and hence stress, being borne by the ducting which is at a significantly lower temperature.

The injecting means includes a plurality of interconnected hoppers and means for selectively pressurizing at least one of the hoppers to enable the movement of wood particles from a first hopper at atmospheric pressure to a last hopper at a pressure substantially equal to the pressure of the combustion chamber.

Other advantages and features of the invention will appear from the following description when considered in connection with the accompanying drawings, in which.

Figure 9:
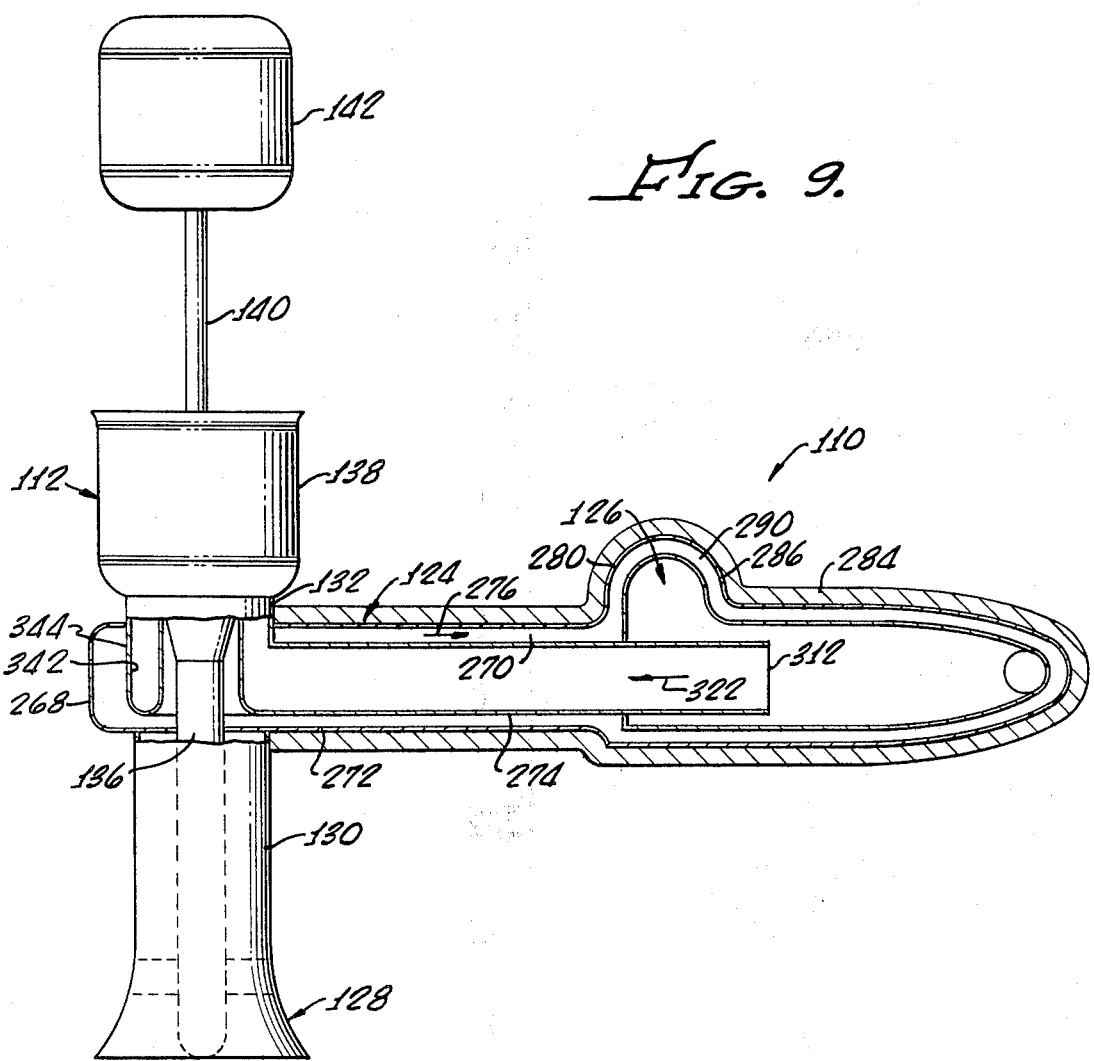
Figure 10:
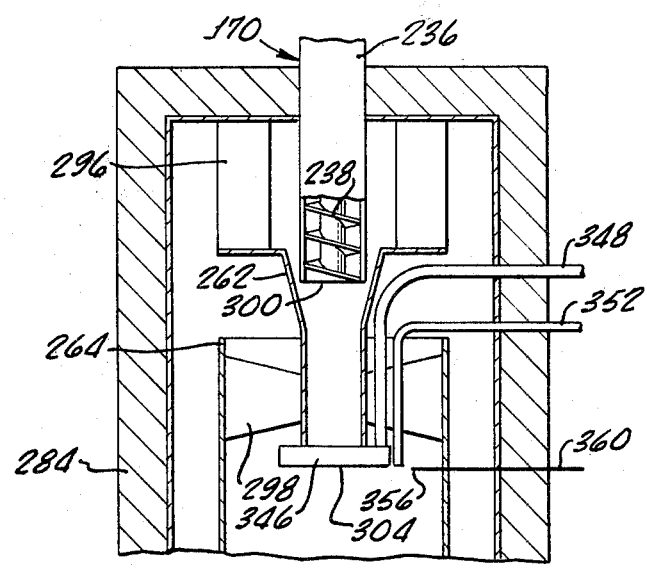

FIG. 9 is a plan view of the apparatus showing the ducting and the turbine engine arrangement including an air intake, a compressor, the ducting system, a high pressure turbine and a power turbine connected to a load through a shaft; and, FIG. 10 is an enlarged view of the upper portion of the combustion chamber and lower end of the feeder system showing in greater detail a screw feed for moving particles from the lower hopper into the combustion chamber, swirl vanes for mixing the compressed air with the wood particles and a propane burner system for use in starting up of the wood burning gas turbine.

CONVENTIONAL FURNACE FOR BURNING POWDERED COAL, OIL OR GAS

Figure 1:
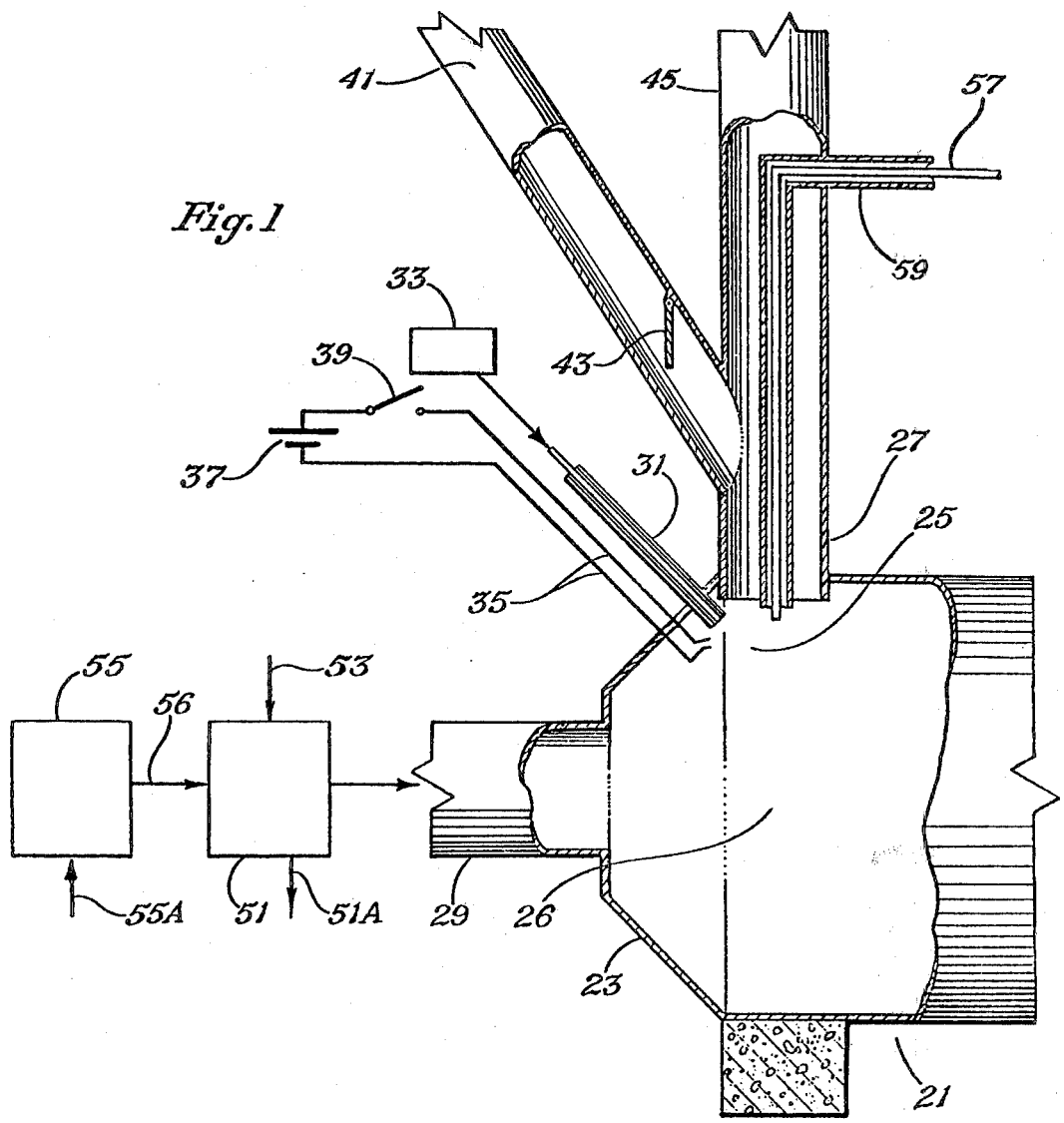
FIG. 1 illustrates a furnace of a conventional boiler system.

Referring now to FIG. 1, there is illustrated at 21 a furnace of a conventional boiler of a power plant for generating steam. The steam is employed to operate generators for generating electricity. The furnace 21 includes a chamber 23 which has a primary combustion zone 25 and a secondary combustion zone 26 located relatively close to the primary combustion zone. A fuel conduit 27 is provided which leads to the primary combustion zone 23. In addition, an air conduit 29 is provided which leads to the secondary combustion zone 26. Also provided are an ignition gas inlet 31 extending from a source 33 of natural gas and spark ignition electrodes 35 coupled to an electrical source 37 and to a switching system illustrated at 39. If powdered coal is used as fuel for the furnace, it is fed through conduit 41 and regulated by gate 43. Simultaneously, 160° F. to 200° F. primary air is fed through conduit and swirl vanes (not shown) located in conduit 45 and mixed with the powdered coal. The preheated mixture flows through conduit 27 to the primary combustion zone 25 where it is ignited by the ignition gas fed through inlet 31 which itself is ignited by the spark electrodes 35. Secondary air is heated to as high as 600° F. and fed through conduit 29 for complete combustion of the powdered coal while air borne in secondary zone 26. The secondary air is heated in a preheater illustrated at 51 in which the incoming air from inlet 53 exchanges heat with the furnaces gases after they have passed through the economizer 55 of the boiler. The furnace gases are applied to the economizer 55 by way of conduit 55A and from the economizer are applied to the air preheater by way of a conduit depicted at 56. The furnace gases are removed from the air preheater 51 by way of conduit 51A. For purposes of definition, the economizer is that section of the system where water returned from the generators is preheated, prior to passage into the boiler tubes, by hot gases that come off of the boiler tubes. Conduits 57 and 59 provide for feed of alternate fuels oil and gas.

DETAILED DESCRIPTION OF THE INVENTION

Figure 2:
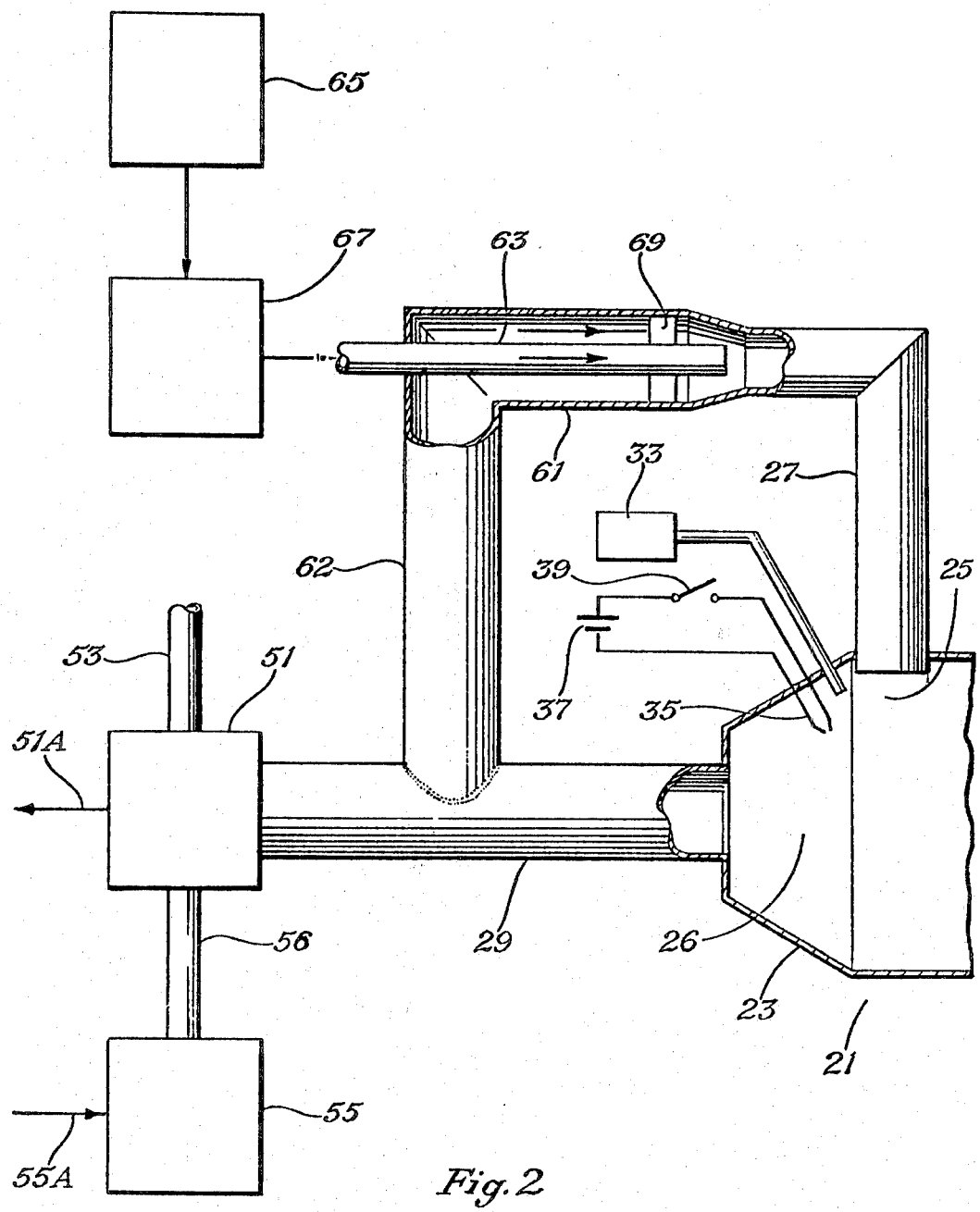
FIG. 2 illustrates the furnace of a conventional boiler system modified to burn wood particles in accordance with one embodiment of the present invention.

Referring now to FIG. 2, there will be described an embodiment of the present invention for burning wood particles in the furnace of an existing boiler system that requires the least modification to the existing boiler system. In FIG. 2, like reference numerals identify like components of that shown in FIG. 1. In the system of FIG. 2 a conduit 61 is coupled to the input of conduit 27 and is coupled from the output of the preheater 51 by way of conduit 62. Concentrically located in the conduit 61 is a wood particle feed tube 63. A wood pulverizer 65 is provided for pulverizing wood chips that may pass through a ½ inch screen. The wood pulverizer may comprise a conventional wood grinder which includes a ½ inch screen. The wood particles that pass through the screen are fed through the feed tube 63 by way of a blower 67. Air from the preheater 51 heated to a temperature of up to about 600° F. or 650° F. is fed through tube 29 into the secondary combustion zone 26 and into conduit 62 for flow through conduit 61. Swirl vanes 69 are located in the annulus between the wood feed tube 63 and the walls of the conduit 61 to create a swirling turbulence and, therefore, more effective mixing of the wood particles and hot air. The preheated wood particles flow through conduit 27 into the primary combustion zone 25 where they are ignited and burned. The heated secondary air is fed into the secondary combustion zone 26 to provide the air temperature required for complete combustion of the wood particles while air borne in the secondary combustion zone 26.

Ideally, the air and wood particles in a three to one ratio by weight should reach an equilibrium temperature which calculations show to be 212° F. for wood containing 38 percent water and 240° F. for wood containing 20 percent water. For wood containing 20 percent moisture, all of the water would have evaporated, given adequate time, while only a small amount would have evaporated from the wood containing 38 percent water. Because of the short time normally available between mixing of wood and air and delivery to the combustion zone, the temperature will not have reached equilibrium. Therefore, (for incoming air having a temperature of 650° F.) some of the surfaces of some particles will reach temperatures approaching the 650° F. temperature of the incoming air while surfaces and sub-surfaces of some particles will be at much lower temperatures. Because of the relatively low equilibrium temperatures that would be reached, it would not necessarily be helpful to increase the time in transit or use additional mixing mechanisms to achieve equilibrium. Gains from higher initial combustion rates resulting from higher surface temperatures could offset the lower subsurface temperatures. Because of the heating up of the particles, the burning rate will be increased, but not an adequate amount to burn the wood at the same rate as pulverized coal for the same BTU output. The choice of three pounds of air to one pound of wood or roughly 45 percent primary air is based upon the much higher volatile content of the wood as compared to coal.

Figure 3:
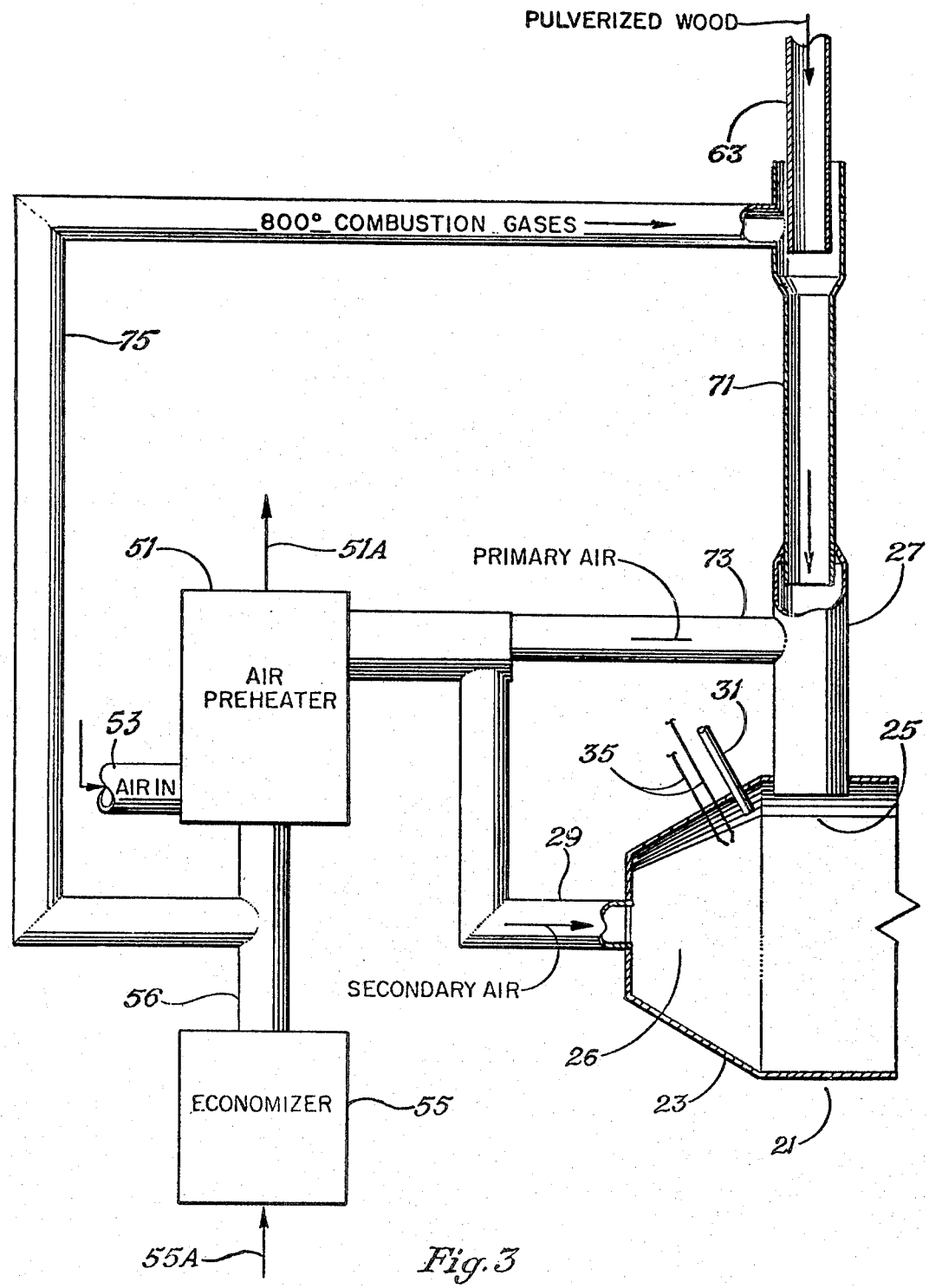
FIG. 3 is a second embodiment of the present invention.

Referring now to FIG. 3, there will be described another embodiment of the present invention. In the embodiment of FIG. 3, like reference numerals identify like components shown in FIGS. 1 and 2. Although not shown in FIG. 3, electrodes 35 will be coupled to electrical source 37 and switch 39 as shown in FIG. 2. In addition, gas inlet 31 will be coupled to a gas source 33. Wood particles feed tube 63 will be fed wood particles from pulverizer 65 and blower 67 as described with respect to the embodiment of FIG. 2. In the embodiment of FIG. 3 conduit 71 is coupled to conduit 27 and the wood particle feed tube 63 is located within the upper end of conduit 71. The output of the air preheater 51 is coupled to the chamber 23 by way of conduit 29 and also is coupled to the conduit 27 by way of conduit 73. The output of the economizer 55 is coupled to the air preheater by way of conduit 56 and also to the upper end of conduit 71 by way of conduit 75. The furnace gases from the economizer 55 have a temperature of the order of 800° F. These gases are applied to the air preheater 51 to heat the air from inlet 53 to the temperature of about 600° F. or 650° F. for application to the secondary combustion zone by way of conduit 29 and for flow into the conduit 27 by way of conduit 73. The 800° F. conbustion or furnace gases from conduit 56 are applied to the upper end of conduit 71 by way of conduit 75. These gases preheat the wood particles flowing into conduit 71 by way of wood particle feed tubes 63. The heated primary air is applied by way of conduit 73 to the wood particles as they flow through conduit 27. As indicated previously, the wood particles then flow into the primary combustion zone 25 for ignition by the ignition gas from inlet 31. The heated secondary air is fed by way of conduit 29 into the secondary combustion zone 26 for complete combustion of the wood particles.

The furnace or combustion gases flow through conduit 75, consist primarily of nitrogen, carbon dioxide, and steam and hence will tend to retard combustion when mixed with the combustion air. Therefore, the quantity used must be kept low in relation to the wood and combustion air. Consider the mixing of 1 pound of 800° F. gases with one pound of wood containing 38 percent moisture and the subsequent addition of three pounds of primary air at 650° F. The equilibrium temperature, if reached, would be 212° F. with a small amount of the water evaporated after mixing the wood with the 800° F. combustion gases. After addition to 3 pounds of combustion air, the equilibrium temperature would be 212° F. with most of the water evaporated. For wood with 20 percent moisture, the equilibrium temperature after mixing the wood with the 800° F. gases would be 212° F. with a small amount of water evaporated, but after addition of the 650° F. air, all of the water would be evaporated and a final temperature of approximately 332° F. will be reached at equilibrium.

An alternative procedure would be to tap 1000° F. combustion gases ahead of the economizer and use them in the same manner. For wood with 38 percent moisture, the temperature reached at equilibrium would be approximately 235° F. with all of the water evaporated. For wood with 20 percent moisture, it would be approximately 360° F. with all of the water evaporated. The foregoing temperatures were computed using the assumption that there would be no pyrolysys of the wood upon mixing the high temperature combustion gases with the wood particles. Some pyrolysis does occur, especially for the small particles. The heat absorbed in the pyrolysis reduces the equilibrium temperature finally reached. However, the combustible gases generated in the process enhance the combustability of the mixture.

Removal of 1 pound of the combustion products per pound of fuel ahead of either the economizer and air preheater reduces the capabilities of the economizer and air preheater to increase the temperature of feed water and combustion air. However, there are two off-setting factors. Wood requires approximately 8 percent less combustion air to provide the same amount of heat as coal, and with partial pyrolysis of the wood, the required excess combustion air can be reduced below that for powdered coal which requires 15 to 30 percent excess air. The 1 pound of combustion products represents approximately 13 percent of the total. Thus, it is probable that at least the temperature of the preheated air can be maintained in a shift from powdered coal to powdered wood even if 13 percent of the combustion products are diverted for heating the wood.

In the foregoing examples, the use of roughly 13 percent of the combustion products is conservative. At the high temperatures involved for the wood particles, primary air, and secondary air, the amount could be substantially higher than 13 percent while maintaining high combustion efficiency.

Figure 4:
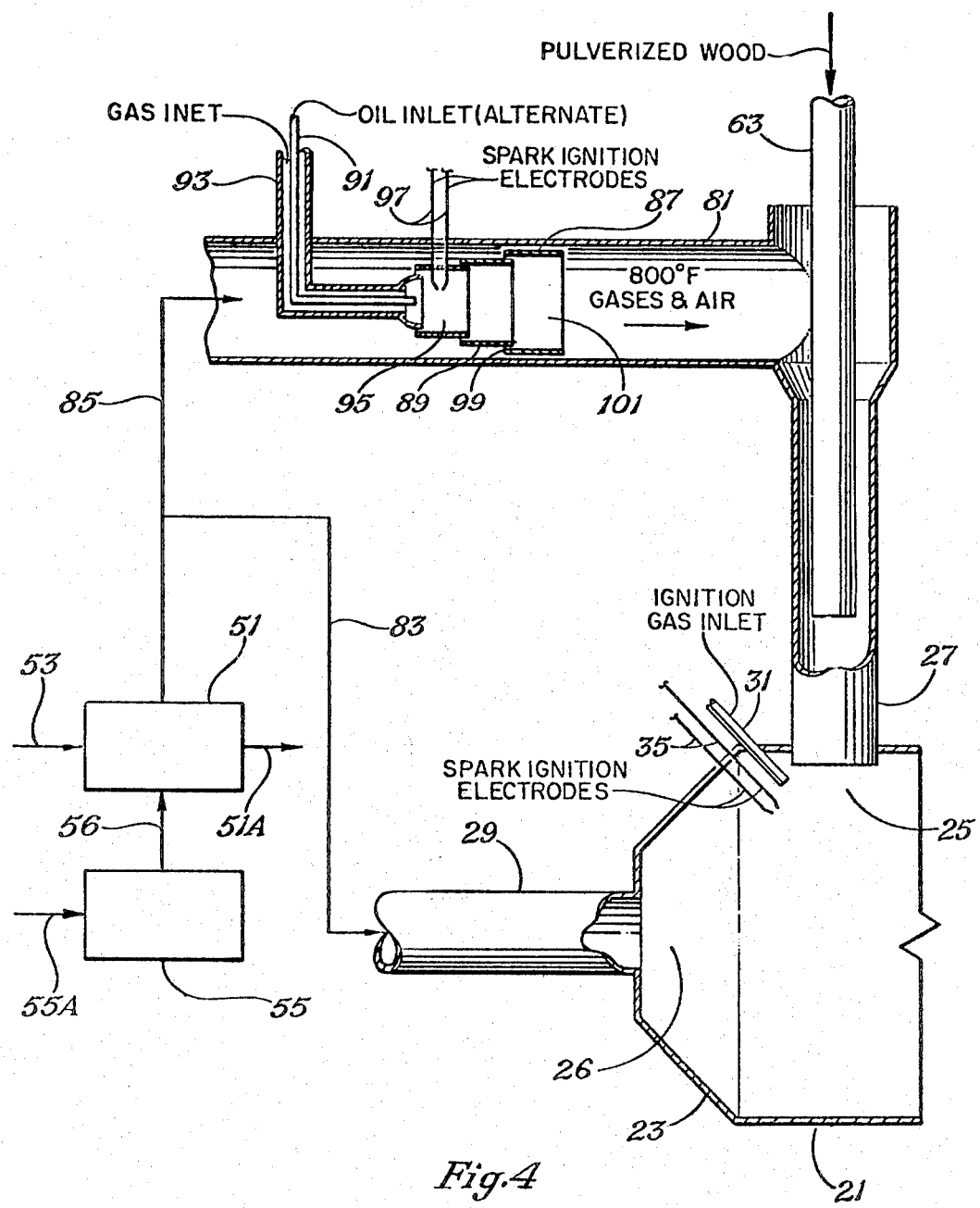
FIG. 4 is a third embodiment of the present invention.

Referring now to FIG. 4, there will be described an embodiment which employs a combustor for oil or gas and a preheated air duct for adding additional heat to the heated primary air. In this embodiment, like reference numerals identify like components as shown in FIGS. 2 and 3. Although not shown, electrodes 35 will be coupled to the electrical source 37 and switch 39 as described previously and in addition the ignition gas inlet 31 will be coupled to a source of gas 33. The wood particle feed tube 63 will be fed with wood particles from the pulverizer 65 and blower 67 as described with respect to the embodiment of FIG. 2. In the embodiment of FIG. 4, a conduit 81 is coupled to the upper end of conduit 27. Eight hundred degree Fahrenheit furnace gases are applied from the economizer 55 to the air preheater 51 by way of conduit 56. Air heated to a temperature of about 600° F. or 650° F. is applied to the conduit 29 by way of conduit 83 and to the conduit 81 by way of conduit 85. Located in conduit 81 is a combustor 87 which comprises a pre-combustion chamber 89 where oil is supplied through conduit 91 or gas is supplied through conduit 93. The fuel and air mixture is ignited in the pre-combustion primary zone 95 by spark ignition means 97. Pre-combustion secondary air for which distribution is controlled by slots 99 in precombustion chamber 89 is mixed in zone 101 to provide gases and air at a temperature of about 800° F. The 800° F. gases and air flow into conduit 27 for mixture with the wood particles from the wood particle feed tube 63. These particles then flow into the primary combustion zone 25 where they are ignited and burned by the ignition gas from inlet 31. The heated secondary air is applied to the secondary combustion zone 26 by way of conduit 83 and conduit 29 for complete combustion of the wood particles.

Thus, in the operation of the system of FIG. 4, the primary air is heated to as high a temperature as possible without resulting in premature combustion of the wood particles. The maximum temperature will depend upon the amount of moisture in the wood and the wood-air mixture rate. In order to raise the temperature of approximately 45 percent of preheated air from 650° F. to 850° F. will require a BTU input from gas or oil equal to approximately 5 percent of the total input of the boiler system. For wood with 38 percent moisture and 850° F. combustor heated air, the final temperature of a three to one ratio of air to wood would be 212° F. with most of the water evaporated. For wood with 20 percent moisture, the maximum equilibrium temperature would be 350° F. with all of the water evaporated. At the 850° F. temperature, there would be some charring and pyrolysis before chilling of the air by the wood particles.

Figure 5:
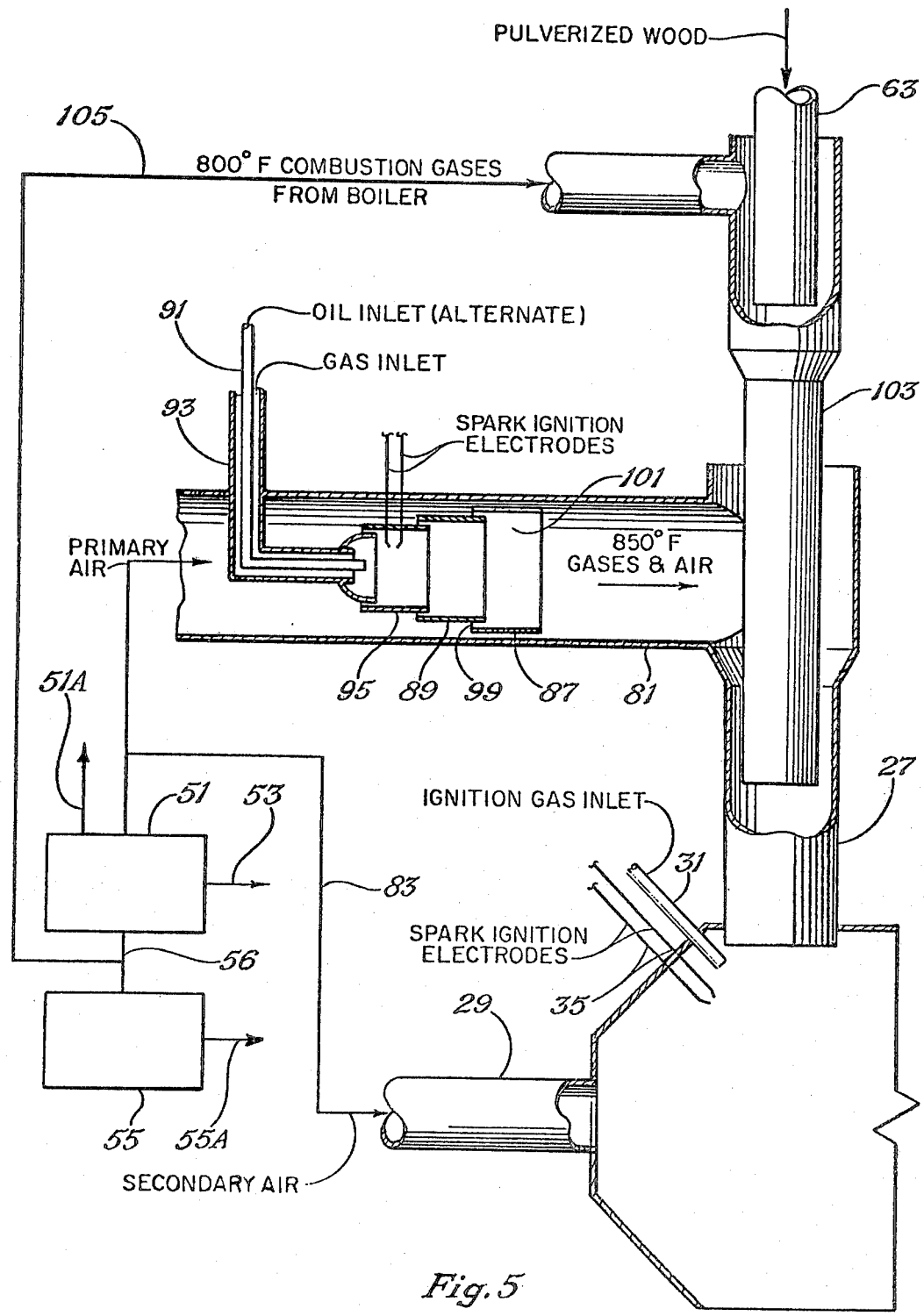
FIG. 5 is a fourth embodiment of the present invention.

Referring now to FIG. 5, there is disclosed an embodiment similar to that of FIG. 4 except that 800° F. gases are tapped from the boiler system and are used to heat the wood particles before the addition of preheated primary air additionally heated to 850° F. In the embodiment of FIG. 5, like reference numerals identify like components shown in FIG. 4. Although not shown, the ignition gas inlet 31 is coupled to a gas source 33 and the electrodes 35 are coupled to an electrical source 37 and a switching system 39. The wood particle feed tube 63 is fed with particles from a pulverizer 65 and blower 67 as described with respect to the system of FIG. 2. In the embodiment of FIG. 5, a conduit 103 is located in the upper end of conduit 103. Conduit 105 is coupled from conduit 56 to the upper end of conduit 103 for applying 800° F. combustion gases from the boiler to the conduit 103. Thus, the system of FIG. 5 operates in the same manner as that of the system of FIG. 4 except that 800° F. gases are tapped from the boiler system and are used to heat the wood particles before the addition of the preheated primary gas additionally heated to 850° F. flowing through conduit 81. For wood with 38 percent moisture, the maximum equilibrium temperature would be approximately 300° F. with all of the water evaporated. For wood with 20 percent moisture, the maximum equilibrium temperature would be approximately 431° F. with all of the water evaporated. As with the system of FIG. 4, charring and partial pyrolysis of the wood particles may reduce the maximum temperature.

The process as described, is primarily concerned with providing a rate of combustion of wood particles that will allow substitution of pulverized wood for powdered coal in power plant boiler systems. The mixing of air at any elevated temperature with wood particles will improve the rate of combustion.

Figure 6:
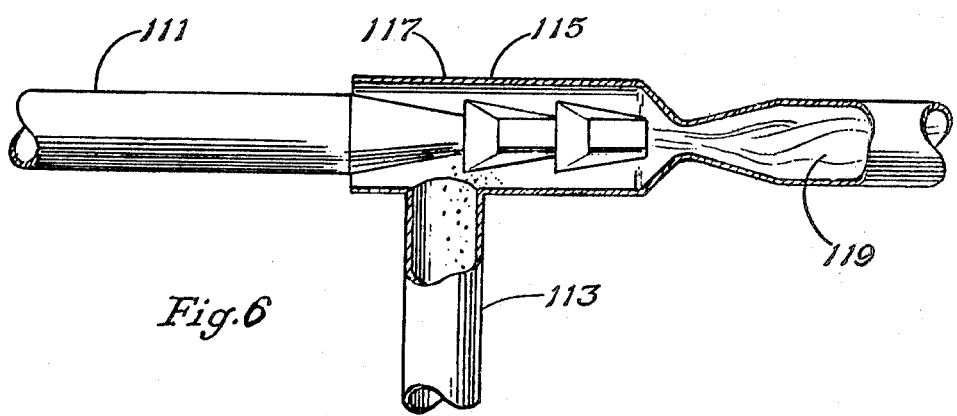
FIG. 6 is a system using a wood fired furnace for raising the temperature of preheated air.

Referring now to FIG. 6, there is shown an arrangement for using a grate fired wood furnace to raise the temperature of the preheated air in the conduit 81 in lieu of the combustor 87. The heated air from the air preheater 51 is fed through conduit 111. The exhaust product from the wood fired furnace are fed into conduit 113 and are drawn through the conduit 113 into the injector assembly 115 by the preheated air from conduit 111 as it flows through aspirators identified at 117. The two streams are diffused and mixed in conduit 119 which would be coupled to the conduit 27 at the position where conduit 81 is coupled thereto in the embodiments of FIGS. 4 and 5.

It is to be understood that the combustor 87 of FIGS. 4 and 5 may be to increase the heat of preheated air flowing through conduit 29 to the secondary combustion zone 26. In addition, the system of FIG. 6, also may be used to increase the heat of preheated air flowing through conduit 29 to the secondary combustion zone 26.

Many power generating systems were specifically designed to burn natural gas or light oil and cannot be easily modified to burn coal. Because the gas or light oil burns cleaner and at a higher rate than coal, the boiler tubes can be spaced more closely, which results in a more compact boiler, but one of restricted fuel options.

Figure 7:
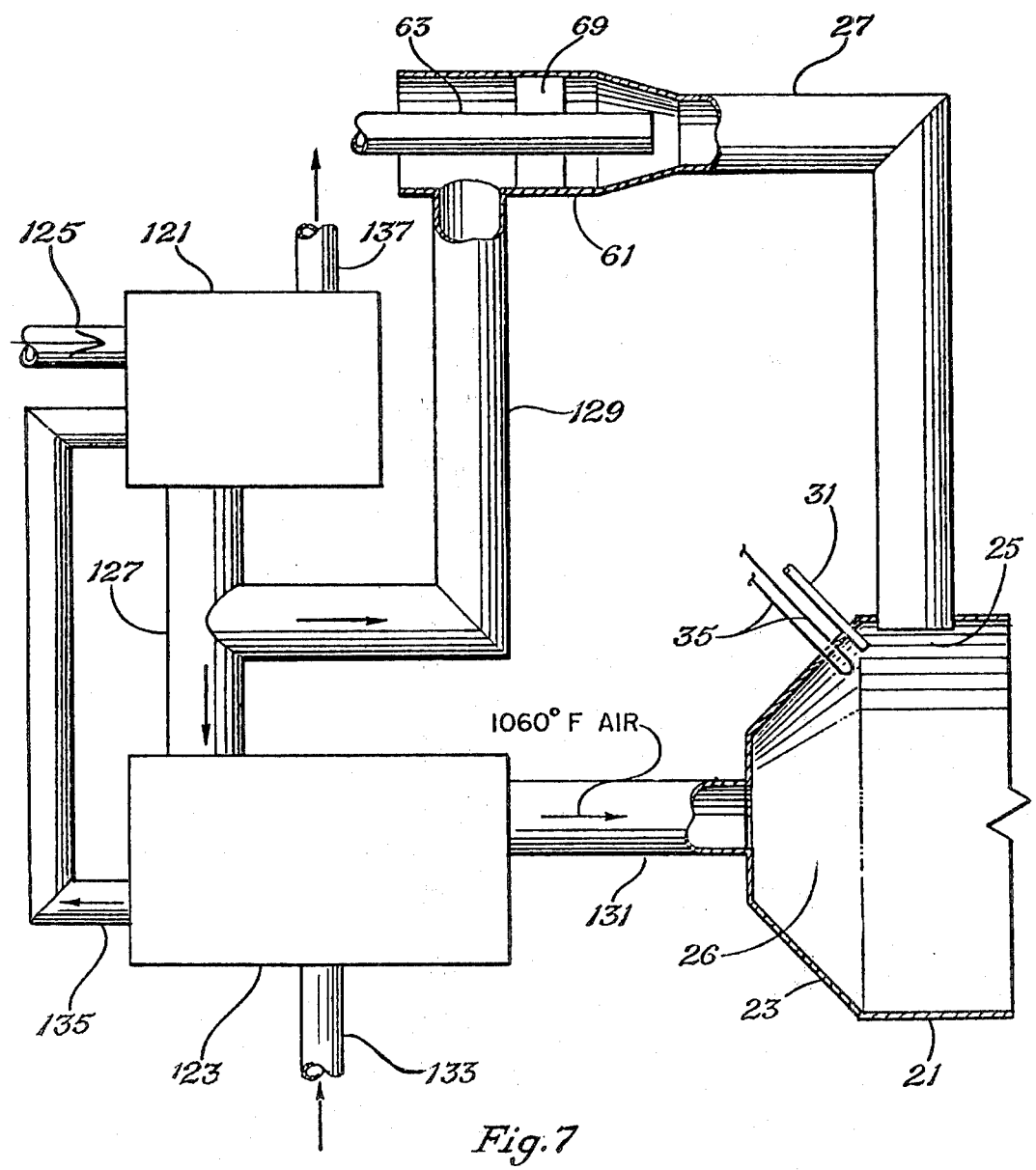
FIG. 7 is an embodiment for burning wood particles in a boiler system which normally burns gas or light oil.

It is well known that reaction rates climb exponentially with increasing temperature. Therefore, if a solid fuel does not disseminate solids, which will clog the space between the boiler tubes, and can be adequately preheated along with the combustion air to provide a burning rate comparable to that for natural gas or light oil it becomes a candidate for use in a natural gas or oil furnace. The ash content of some wood specimens (pine for example) is on the order of 0.5 percent which is the same as that for some residual oils, whereas the ash content of coal ranges from 4 to 14 percent. Further, the fly ash from wood is less adhesive than that from coal and can more easily be cleaned from boiler tubes by installing soot blowers. To convert gas or light oil furnace to use of wood, especially green wood burned in a conventional manner normally would require extensive modification. Referring to FIG. 7, there will be described a system and method for converting a gas or light oil furnace to use of wood that minimizes the extent of modification and maintains the rated output of the boiler upon converting to wood. In this embodiment, like reference numerals indentify like components as described previously. Although not shown, electrodes 35 will be coupled to the electrical source 37 and switch 39 as described previously and in addition the ignition gas inlet 31 will be coupled to a source of gas 33. The wood particles feed tube 63 will be fed with wood particles from the pulverizer 65 and blower 67 as described above. In the normal boiler system which uses gas or light oil, the combustion gases at 2300° to 2500° F. passes across the boiler tubes where heat is imparted to the steam or water inside the tubes and leaves the tubes at approximately 1100° F. The gases then enter the economizer which transfers heat from the combustion gases to the boiler feed water. The gases leave the economizer at approximately 830° F. and enter the combustion air preheater. They leave the preheater at approximately 400° F. In the system of FIG. 7, the economizer has been replaced with a second air preheater which provides a degree of flexibility in burning wood particles that will allow conversion from gas or light oil to wood. For example, air at 70° F. entering the second preheater and leaving at 850° to 900° F. can be used for secondary combustion and greatly increase the burning rate in the furnace. As a second example, part of the combustion air leaving the first preheater at 650° F. can enter the second preheater and leave at 1000° F. or higher.

In the system of FIG. 7, the two air preheaters are identified at 121 and 123. Air preheater 121 has an inlet 125 and an air outlet 127. Air outlet 127 is connected to the inlet of preheater 123 and to conduit 62 by way of conduit 129. The outlet 131 of preheater 123 leads to the secondary combustion zone 26 of chamber 23. Hot gases from the boiler tubes of the furnace are ducted through the second preheater 123 and then through the first preheater by way of conduits 133, 135, and 137. In operation, the incoming air from inlet 125 exchanges heat with the furnace gases to produce the 650° F. air at outlet 127. This air is applied to conduit 61 for mixture with the wood particles and to the second air preheater 123. The preheated wood particles flow through conduit 27 into the primary combustion zone 23 where they are ignited and burned. In the second air preheater 123, the 650° F. air exchanges heat with the furnace gases to produce air at a higher temperature (1060° F. as shown in FIG. 7) which is applied to the secondary combustion zone 26 to increase the burning rate of the furnace.

Both preheaters can be adjusted to provide whatever temperatures are desired below those in the examples cited. This can be accomplished by changing rotative speeds on regenerative type preheaters. Regenerative type preheaters have rotating elements that are alternately brought in contact with hot combustion gases and the air to be heated. For example, the Ljungstrom type regenerative preheater uses a revolving spider which carries segments of alternate crimped and plain sheets arranged concentrically and contained within a circular housing. Hot gases pass through one half of the housing and cold air down through the other half. The rotor turns at approximately 3 rpm moving the sheets that are heated by the hot gases into region traversed by the cold gases and vice versa. For temperatures up to 1000° F. the sheets are made of carbon steel. For temperatures up to 1700° F. they are made of chrome-nikel steel. For this application the heat exchanger which replaces the economizer should be made of chrome-nikel steels, preferable 310 stainless steel for long life.

The pulverization of coal to a fine powder is economical whereas it is not with wood. The approximate smallest representative economical particle size for wood is 5/16"×1/16"×3/64" whereas for coal it is approximately 74 microns. For the wood particle, the ratio of surface area to particle weight is approximately 13 times that for coal. Thus, the burning rate for the coal particle would be approximately 13 times that for the wood if the basic burning rates for coal and wood were equal. It is well known that chemical reaction rates increase rapidly with temperature except in special cases where catalysts are involved. Therefore, in order to overcome the disadvantage of the higher surface area to weight ratio for wood, the temperature of the wood particles and combustion air must be increased. The amount of the increase may be approximated by use of the teachings of Arrhenius (1889) in which he found that chemical reactions vary approximately as the 6th to 8th power of the absolute temperature. Based upon the 6th power, to achieve a burning rate equal to coal the primary air temperatures for wood should be approximately 500° F. and the secondary air temperature should be approximately 1250° F. Based upon the 8th power, the primary air temperature should be approximately 420° F. and the secondary air should be approximately 1060° F. The dryness of the wood and mechanical arrangement of the burner will affect the temperature requirements, but the order of magnitude is established by the foregoing approximations, and it is evident that to burn wood particles at the desired rate, an arrangement in which a second air preheater replaces the economizer represents an improvement.

An economizer is not essential to a boiler system, and in this case where the waste heat is being put to a different use, it may be suitable to feed the boiler feed water directly into the boiler to counter the effect of the hotter primary and secondary air. In case heating of feed water is essential, it may be done in a conventional type wood burning, grate fired boiler located some distance from the main boiler, with feed water being piped in through insulated lines.

In the embodiment of FIG. 7, the second air preheater is shown as having replaced the economizer. For an alternate arrangement, the economizer may be retained and the second preheater may be placed ahead of the economizer so that hot combustion gases from the boiler tubes move in sequence through the second preheater, economizer, and first preheater. For another alternate arrangement the second air preheater may be placed alongside the economizer with hot gases from the boiler tubes being divided to pass in parallel through both the second air preheater and the economizer and then combining again to pass through the first air preheater.

While the method and system of the present invention is directed toward burning of wood particles, it is equally applicable burning of refuse, bassage, peat, lignite, and other low grade fuels that can be ground into small particles. These fuels are all primarily fibrous or non-crystaline in form.

Figure 8:
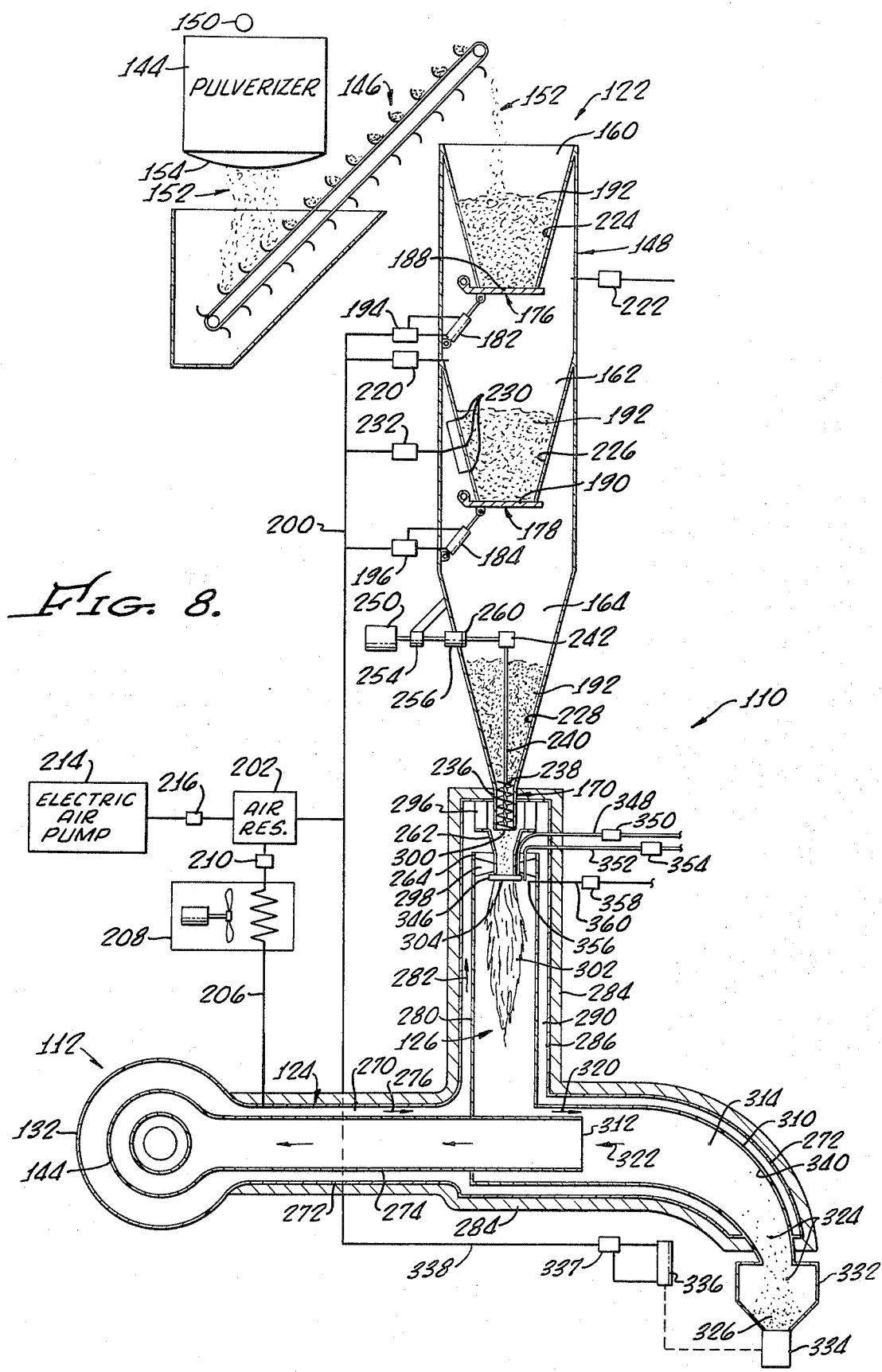
FIG. 8 illustrates a wood burning gas turbine system, in elevation, showing generally a feeder system, a combustion chamber, a ducting system and a gas turbine.

Referring now to FIGS. 8 and 9,, wood burning gas turbine apparatus 110 generally includes a turbine engine 112 with a wood burning combustion chamber 126 and a wood particle feeding system 122.

The gas turbine engine 112 may be of a commercially available type, such as Model No. LM2500 manufactured by General Electric Co., the combustor portion, not shown, of the commercial turbine engine being replaced by ducting 124 communicating with the combustion chamber 126. Included in the turbine engine are an intake 128, a compressor 130, a high pressure gas turbine 132 connected to the air compressor by means of a drive shaft 136, and a gas power turbine 138.

The power turbine operates in a conventional manner utilizing the exhaust from the high pressure turbine 132 to drive an electric generator 142 through a drive shaft 140. As illustrated in FIG. 8, the feeder system 122 generally includes a pulverizer 144, a collector-elevator 146 and a hopper system 148. The pulverizer may be of any suitable type that can reduce the size of entering wood chips 150 to wood particles 152 which can pass through a screen, or plate, 154 having approximately one-half to three-quarters inch performations therein. It is to be appreciated that the size of wood particles which may be utilized by the wood turbine apparatus 110 in part depends upon both the moisture content and the type of the wood. The collector-elevator 146, is operative for transporting the wood particles 152 into a first hopper, or bin, 160 of the hopper system 148.

In general, the hopper system 148 may include three interlocking hoppers or bins 160, 162, 164 and a screw feeder 170. Since the combustion chamber 126 is pressurized by the air compressor 130, as hereinafter discussed, the hopper system 148 should preferably include air locks 176, 178 to enable moving wood particles from the first bin 160, at atmospheric pressure, into the last bin 164 which pressurized to approximately the combustion chamber pressure.

It is to be appreciated that an alternate system, not shown, for wood particles from a supply at atmospheric pressure into the pressurized combustion chamber 126 may be utilized, provided that sufficient wood particles can be conveyed in order to maintain a desired combustion rate within the combustion chamber 126.

Briefly, the hopper system 148 may include pneumatic actuators 182, 184 operatively connected to moveable gates 188, 190, respectively, to enable passage of accumulated wood particles 192 from bin 160 to bin 162, and from bin 162 to bin 164, respectively. The actuators 182, 184 are remotely operated by solenoid valves 194, 196, respectively, through a high pressure air line, or conduit, 200 connected to an air reservoir 202. The air reservoir 202 is fed from the compressor 130 via a conduit 206 and an air cooled heat exchanger 208, a check valve 210 preventing the air reservoir 206 from unloading through the compressor 130 when the apparatus 110 is shut down.

Air pressure in the reservoir 202 may be maintained by an electrically driven air compressor 214 connected to the air reservoir through a valve 216 in order to operate the hopper system as may be necessary when the turbine is not up to speed, and to otherwise increase the pressure established by the air compressor 130 as may be necessary to dislodge particles at the walls within the bins 160, 162, and 164 as will be hereinafter discussed.

A remote controlled valve 220 enables pressurization of bin 162 by introducing air from the reservoir 202 through the air line 200, while a remote controlled release valve 222 enables depressurization of the bin 162 to atmospheric pressure as will be hereinafter discussed in connection with operation of the wood burning turbine apparatus 110. It should be appreciated that while pneumatic controls are shown in this exemplary, other electromechanical devices, not shown, could be used with appropriate controls.

In order to prevent bridging of the wood particles between the bins sides 224, 226, 228 respectively, the sides of the bins preferably should not exceed an angle of approximately fifteen degrees from the vertical. To further insure against bridging or adherence of the wood particles to the bin sides 224, 226, 228, air may be injected at a plurality of ports 230 through the bin sides via a remote control valve 232 connected to the air line 200 and air reservoir 202. It is to be appreciated that although only these ports 230 are shown in bin 162 (FIG. 8), for clarity, a larger number of ports, not shown, into the bin 162 may be required, and that each of the other bins 160, 164 will preferably have a plurality of ports, and control valves, not shown.

When the bins 162 and 164 are pressurized, it is necessary to utilize the air compressor 214 to maintain a pressure gradient over and above the air pressure from the compressor 130 in order to establish a flow of air through the air ports 230 into the bins 162 and 164 in order to dislodge wood particles from the bin sides 226, 228.

The third, or last, bin 164 includes a cylindrical lower portion 236 thereon, which encloses a feed screw 238, the latter being driven by a drive shaft 240 from a gear box 242. Power is supplied to the gear box 242 by means of a shaft 248 driven by a variable speed electric motor 250, bearings 254, 256 being provided as necessary to support the shaft 248. The bearing 256 supporting the shaft 248 at the bin side 228 preferably includes a seal 260 to prevent air leakage therepast.

As more clearly shown in FIG. 10, the feed screw 238 is enclosed by a preswirl chamber 262 which communicates with an upper portion 264 of the combustion chamber 126. It is preferable that the feed screw 238 operates to inject wood particles 152 downwardly toward the combustion chamber in order to reduce clogging of the wood particles.

Precombustion heating of the fibrous wood particles causing pyrolysis of at least some of the particles to form pyrolysis products is caused by hot air from the compressor 130 which is mixed with the wood particles 152 in the preswirl chamber 262.

The compressor may be either an axial flow or a centrifical type having several stages of compression which result in compressing air, taken in through the inlet 128, to a pressure from approximately 150 to 300 psi and a temperature of approximately 600° F. to 800° F. The high pressure air moves from the compressor 130 into a collector 268 (FIG. 9) and thereafter through an annulus 270 formed between an outer duct 272 and inner tube, or duct 274, the air flow being designated by an arrow 276.

The outer duct or shell 272 extends to the bin cylindrical portion 236 and completely encloses the combustion chamber 126 and preswirl chamber 262. Thus the air from the compressor passes over combustion chamber walls 280 of the combustion chamber thereby causing additional heating of the air during its passage therealong as shown by an arrow 282 causing the temperature of the air, introduced into the preswirl chamber 262, to be approximately 1000° F. An insulating material, such as fiber glass 284, covers the outer duct 272 in order to decrease thermal losses from the apparatus.

This important ducting feature enables the combustion chamber 126 to operate at temperatures such that the combustion chamber walls 280 maintain a temperature between 1200° F. and 1500° F. without subjecting the combustion chamber walls to high stresses since the pressure inside the combustion chamber and outside the combustion chamber, in an annulus 290 thereabout, are approximately equal.

While other arrangements may provide for additional heating of the compressed air for pyrolyzing the wood particles, the present embodiment is preferable in that it conserves energy while at the same time enabling the combustion chamber to be constructed to materials which could not be used if the combustion walls 280 were required to contain up to 300 psi pressure at a temperature of approximately 1200°–1500° F.

As shown in FIG. 10, the compressed hot air is introduced into the preswirl chamber 262 via stationary pressure vanes 296 which cause turbulence within the air flow and hence enhanced mixing with the fibrous wood particles 152 as the particles are injected, or fed, by the feed screw 238 into the combustion chamber 126. Additional air necessary for complete combustion is preferably introduced into the combustion chamber upper portion 264 through secondary air preswirl vanes 298 to enhance mixing of the air, wood particles and pyrolysis products. The proportion of air flowing through each of the preswirl vanes 296, 298 is dependent upon the pitch of the preswirl vanes. That is, because both sets of preswirl vanes 296, 298 communicate with the annulus 290, containing compressed hot air, the amount of air passing through each of the preswirl vanes, respectively, depends upon the resistance to the passage of air therethrough, which in turn is dependent upon the angle or pitch the vanes have with respect to the incoming air flow, larger angles causing greater air flow resistance and consequently less air flow.

Upon initial mixing of the hot compressed air and wood fibrous particles, pyrolization of the wood surfaces occurs, resulting in charred wood particles and combustible gases having an average temperature between 700° and 750° F. It has been found that within three inches past and end 300 of the feed screw 238 where mixing of the approximately 1000° F. air and approximately 70° F. wood particles occurs, the air temperature is reduced to approximately 700°–750° F., the mixing time being approximately five to ten milliseconds. As hereinbefore pointed out, the pyrolization of the wood particles produces or drives off, volatile combustible gases which enhance the combustability of the resultant mixture. Such volatile gases may constitute up to approximately 80 percent of the weight of the wood depending on the moisture content of the wood.

Within milliseconds, the pyrolysis products are fed into a combustion zone 302 within the combustion chamber 126, the length of the combination zone, as well as the combustion chamber, being dependent in part upon size and moisture content of the wood particles. It has been found that green wood having a particle size of approximately one-half to three-quarter inch maximum dimensions and a moisture content of approximately 50 percent can be burned with heat release rates up to approximately 150,000 BTU/ft$^3$/per hour.

The output of a G.E. LM 2500 turbine with liquid fuel is approximately 23,000 hp. Driving a 94 percent efficient electric generator, the electrical output would be approximately 16 megawatts. The same output in accordance with this invention may be achieved using approximately 475 tons of green wood per day. Because this heat release rate is as high as 100,000 BTU/ft$^3$/per hour, this combustion chamber may be less than approximately 30 inches in diameter, with a length of approximately 10 feet.

The wood particles 152 and pyrolysis products or gas, not shown, are completely burned in suspension within the combustion zone 302 which extends downwardly from an end 304 of the preswirl chamber 262.

The hot combustion gases from the combustion chamber 126 are conducted by means of a conduit, or duct, 310, past an inner conduit inlet 312 to form a separation zone 314 in which the flow of the hot combustion products undergoes a 180° change in direction, shown by an arrow 322. Hence the combustion products are swirled as they enter the duct 274 forming a vortex in which the momentum of ash particulates 324, causes separation thereof from the combustion gas flow and into a collection chamber 332. A valve 334 is provided in order to periodically blow off accumulated ash particulates 326 accumulated in the chamber 332, the valve being preferably a ball valve and remotely operated by means of a solenoid connected to the air reservoir 202 through a control valve 337 a line 338. The high pressure gases within the duct 310 discharging into the atmosphere, force the accumulated ash particles 326 out of the chamber 332 in a rapid manner.

Although shown in FIG. 8 as being disposed proximate the collection chamber 332, the valve 334 is preferably disposed at a distance apart from the collection chamber 332 so that its temperature will remain below that required for valve sealing material, not shown. By disposing the valve 334 a sufficient distance apart from the swirling hot combustion gases, the temperature of the valve can be sufficiently low to enable the use of teflon sealing materials which are operable at temperatures approaching 500° F. It is expected that particle sizes as small as 0.1 to 3.0 microns in diameter can be efficiently removed by the hereinabove described ducting configuration. Further, since the wood ash 324 is relatively non-adhesive, it is expected that significant amounts of ash will not build up on interior surfaces 340, substantially all the ash 324 being collected in the chamber 332.

Further, as hereinabove pointed out, the ash, 324 from the wood particles 152 may constitute less than 0.5 percent of the total weight of the wood. This approaches the ash content of some residual oils, hence erosion of turbine blades, not shown, and clogging of interior surfaces 342 of a turbine inlet ring 344 and other turbine interior surfaces, not shown, is not expected.

The duct 274 pases the hot combustion gases into the turbine inlet ring 344 (FIG. 9) and high pressure turbine 132. It is to be appreciated that, while only one combustion chamber 126, and associated ducting 124, are illustrated in conjunction with the turbine engine 112, a plurality of similar combustion chambers and feeding systems, not shown, may be utilized using appropriate ducting, communicating with this turbine engine, as may be necessary to provide adequate combustion gases to a larger turbine engine.

In order to start the wood burning gas turbine apparatus 110, it is necessary to employ a fuel that burns readily at atmospheric temperatures until the compressor 130 has sufficient rotation to produce compressed hot air as required for steady state operation. This fuel may be propane gas which is introduced into the combustion chamber by a burner ring 346 (FIG. 10) connected to a propane supply, not shown, via a tube 348 and a control valve 350. An ignition of the start-up fuel is enabled by a pilot flame, not shown, sustained by a separate propane fuel line 352 and control valve 354. Ignition of the pilot flame is achieved in a conventional manner through an electrical igniter 356 powered by a transformer 358 via an electrical line 360.

In operation, the apparatus 110 using propane gas fuel until the compressor 130 reaches operating speed and produces air compressed to 100 to 300 psi at a temperature of 700° F. to 800° F. At this time, the motor 250 driving the wood feed screw 238, is turned on introducing wood particles 152 into the combustion chamber 126. Approximately 5 to 15 seconds after the wood feed motor 250 is turned on, the propane gas is turned off. Mixing of the hot combustion air and the green wood particles 152 then occurs with the 1000° F. air and the approximately room temperature wood particles being mixed by the primary and secondary swirl vanes 296, 298, the estimated time of mixing being on the order of 5 to 10 milliseconds. During this time partial pyrolysis of the particles 152 produces combustible gases, not shown, and the air temperature may drop to near 700° to 750° F. within three inches of the end 304 of the preswirl chamber 262. As the wood particles move into the combustion zone, surface heating of the wood particles continues.

It should be appreciated that because the pyrolysis occurs as the wood particles are entering the combustion zone, rapid burning of large wood particles, for example, those passing through the half inch screen 154, is enabled.

A continuous flow of wood into the combustion zone is maintained by the hopper system 148 hereinabove described. In operation, after the first bin 160 is filled with wood particles by the collector-elevator 146, the pneumatic actuator 182 is operated by the solenoid valve 194 to open the gate 188, dumping the wood particles into the second bin 162. After bin 162 is filled and the gate 188 closed, bin 162 is pressurized to a pressure equal that in bin 164 by opening valve 220 to allow air from the air reservoir 202 to pass into bin 162. Subsequent to equalization of the pressure between bins 162 and 164, the pneumatic actuator 184 operated by the solenoid valve 196 opens the gate 190 to dump the wood particles into bin 164. The gate 190 is then closed and the pressure in bin 162 is release by opening the two-way solenoid valve 222 so that the filling operation can be repeated.

Although there has been described hereinabove a particular arrangement of a wood burning boiler system and gas turbine apparatus in accordance with the invention for the purpose of illustrating the manner in which the invention may be used to an advantage, it will be appreciated that the invention is not limited thereto. Accordingly, in all modifications, variations or equivalent arrangements which may occur to those skilled in the art, should be considered to be within the scope of the invention as defined in the appending claims.

What is claimed is:

1. A system for burning fibrous particles, comprising:
   a combustion chamber;
   a turbine;
   injecting means for feeding fibrous particles into the combustion chamber in a substantially continuous manner;
   pyrolysis means for pre-combustion heating the particles as the particles are being fed into the combustion chamber and for pyrolyzing at least some of the particles to form pyrolysis products, said pyrolysis products being fed into the combination chamber with unpyrolyzed particles;
   said pyrolysis means including an air compressor mechanically driven by the turbine and means for mixing compressed air with the particles as the particles are being fed into the combustion chamber, said pyrolysis means further including means for heating the compressed air before mixing of the compressed air with the particles, the means for heating the compressed air including means for passing the compressed air over an exterior surface of the combustion chamber;
   means for igniting the particles and pyrolysis products in the combustion chamber;
   means for injecting air into the combustion chamber for enabling combustion of the particles and pyrolysis products therein to form combustion gases; and,
   means for injecting the combustion gases into the turbine.

2. A system for burning fibrous particles comprising:
   a pressurized combustion chamber;
   a turbine;
   injecting means for feeding fibrous particles into the pressurized combustion chamber in a substantially continuous manner;
   pyrolysis means including an air compressor, drive by the turbine, for compressional air heating and mixing means upstream of the combustion chamber for mixing the compressionally heated air with the particles as the particles are being fed into the combustion chamber and for thereby pyrolyzing at least some of the particles to form pyrolysis products, said pyrolysis products being fed into the combustion chamber with unpyrolyzed particles, said pyrolysis means including pressurized duct means for feeding air, compressionally heated by the compressor, into the mixing means, said duct means enclosing the combustion chamber;
   means for igniting the unpyrolyzed particles and pyrolysis products in the combustion chamber;
   means for injecting air into the combustion chamber for enabling combustion of the unpyrolyzed particles and pyrolysis products therein to form combustion gases; and,
   means for injecting the combustion gases into the turbine to enable operation thereof.

3. The system of claim 2 further including second duct means for separating ash from the combustion gases before injection of the combustion gases into the turbine.

4. The system of claim 3 wherein the second duct means includes valve means, disposed remotely from said combustion chamber for removal of the ash from the second duct means.

5. The system of claim 4 wherein the duct means is configured for causing the compressed air to circulate past the combustion chamber for heating of the compressed air before it is fed into the combustion chamber.

6. The system of claim 2, wherein the injecting means includes a plurality of interconnected hoppers and means for selectively pressurizing at least one of the hoppers to enable the movement of wood particles from a first hopper at atmospheric pressure to a last hopper at a pressure subsequently equal to the pressure of the combustion chamber.

7. The system of claim 6 wherein the injecting means includes screw feeder means for moving the wood particles from the last hopper into the combustion chamber.

8. The system of claim 7 wherein the injecting means includes pneumatically operated gate means for enabling movement of the wood particles from one hopper to another hopper.

9. The wood burning gas turbine apparatus of claim 8 wherein the injecting means including means for feeding pressurized air from the air compressor to the pneumatically operated gate means and cooling means for cooling said pressurized air before it is fed to the gate means.

* * * * *